United States Patent [19]

Ueda

[11] Patent Number: 5,138,445

[45] Date of Patent: Aug. 11, 1992

[54] MOTION VECTOR DETECTOR CIRCUIT

[75] Inventor: Kazuhiko Ueda, Yokohama, Japan

[73] Assignee: Victor Company of Japan, Ltd., Yokohama, Japan

[21] Appl. No.: 673,820

[22] Filed: Mar. 22, 1991

[30] Foreign Application Priority Data

Mar. 23, 1990 [JP] Japan .................................. 2-74392

[51] Int. Cl.$^5$ ........................ H04N 7/18; H04N 5/228
[52] U.S. Cl. .................................... 358/105; 358/222; 354/430
[58] Field of Search .................... 358/105, 222, 213.19, 358/228, 209, 213.2, 125, 166, 167, 183; 354/430

[56] References Cited

U.S. PATENT DOCUMENTS

| | | | |
|---|---|---|---|
| 4,091,415 | 5/1978 | Limb et al. | 358/105 |
| 4,364,087 | 12/1982 | Storey et al. | 358/105 |
| 4,403,256 | 9/1983 | Green et al. | 358/222 |
| 4,410,914 | 10/1983 | Siau | 358/222 |
| 4,717,958 | 1/1988 | Gal et al. | 358/222 |
| 4,862,277 | 8/1989 | Iwaibara | 358/222 |
| 4,864,409 | 9/1989 | Platte et al. | 358/222 |
| 5,012,270 | 4/1991 | Sekine et al. | 358/222 |
| 5,032,914 | 7/1991 | Fujita | 358/105 |
| 5,053,875 | 10/1991 | Ishii et al. | 358/222 |

FOREIGN PATENT DOCUMENTS 0158879 6/1989 Japan .
0325427 7/1989 Japan .

Primary Examiner—James J. Groody
Assistant Examiner—Michael H. Lee
Attorney, Agent, or Firm—Fleit, Jacobson, Cohn, Price, Holman & Stern

[57] ABSTRACT

There is provided a motion vector circuit for detecting screen shake of an image of an object. The circuit comprises a binary-coded edge portion signal generator for signal-processing a video signal corresponding to the image to generate a binary-coded edge portion signal including information of the edge portion of the image, a detector for delaying the binary-coded edge portion signal by a predetermined period of time to generate a delayed binary-coded edge portion signal so as to generate detection signals with time width corresponding to shake amount of the image by means of the binary-coded edge portion signal and the delayed binary-coded edge portion signal and a calculator for generating moving vector signals corresponding to the direction and the amount of the image by means of the detection signals to calculate the shake amount of the image by means of the moving vector signals and predetermined allowable deviation.

7 Claims, 11 Drawing Sheets

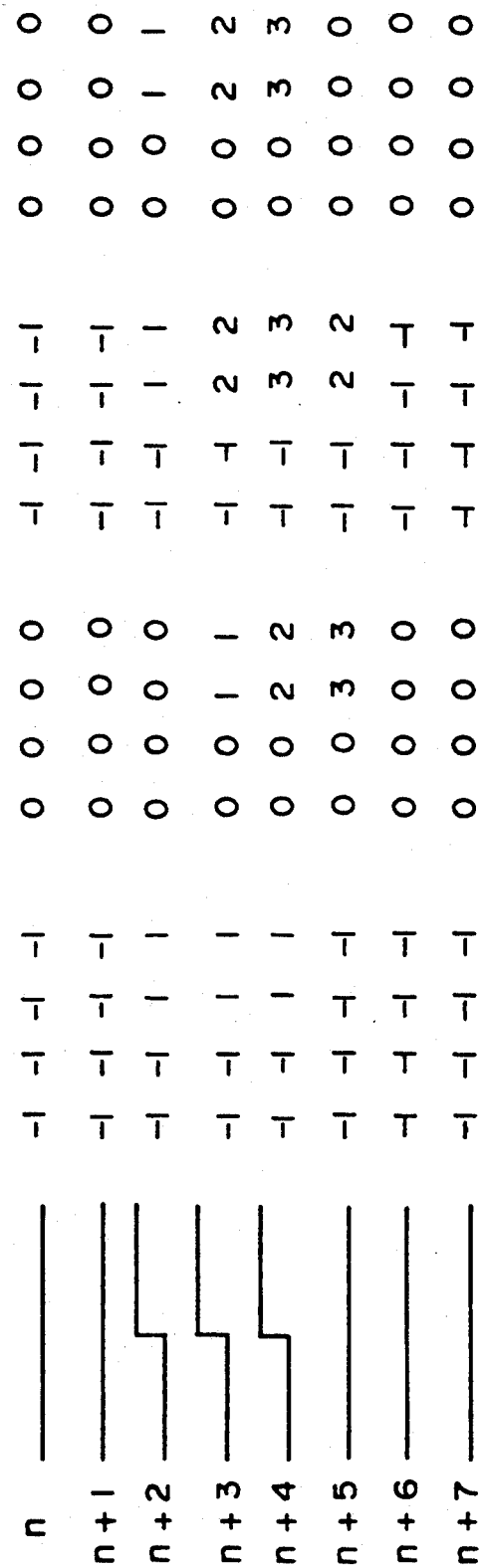
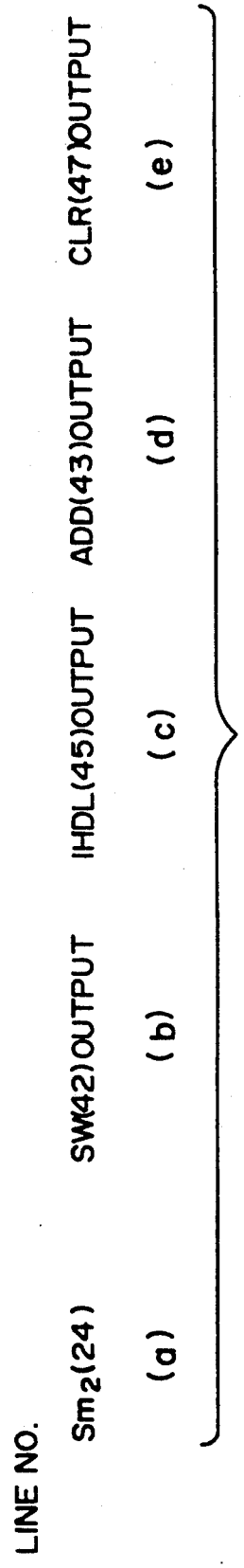
FIG.15

MOTION VECTOR DETECTOR CIRCUIT

BACKGROUND OF THE INVENTION

The present invention relates to a motion vector detector circuit for a television camera.

When an object is shot by a television camera and the television camera moves or shakes due to some cause, there is screen shake in the reproduced image that is displayed on the display screen. This television camera shake is caused for example, when a shot is taken from aeroplanes, automobiles or other moving bodies, or when the hand of the camera operator shakes during shooting.

One conventional means of preventing the generation of playback image shake caused by the shaking of a television camera involves placing the television camera on a vibration-proof platform for example, and then shooting an object.

Another recent means involves the implementation of signal processing to the image signals so as to compensate the image signals to a status where there is no screen shake.

The above means has the disadvantage of the necessary apparatus becoming large in scale when the television camera is placed on a vibration-proof platform for the image shot. Not only this, a large apparatus for the large, complex circuits is also required for a conventional screen shake compensation apparatus that performs image signal compensation so that the image becomes a status where there is no screen shake. The scale of this apparatus is to an extent where it is not possible to incorporate it into a compact television camera, for example.

SUMMARY OF THE INVENTION

An object of the present invention is to provide a motion vector circuit for detecting screen shake of an image of an object which comprises binary-coded edge portion signal generation mean for signal processing a video signal corresponding to the image to generate a binary-coded edge portion signal including information of the edge portion of the image, detection means for delaying the binary-coded edge portion signal by a predetermined period of time to generate a delayed binary-coded edge portion signal so as to generate detection signals with time width corresponding to shake amount of the image by means of the binary-coded edge portion signal and the delayed binary-coded edge portion signal and calculation means for generating moving vector signals corresponding to the direction and the amount of the image by means of the detection signals to calculate the shake amount of the image by means of the moving vector signals and predetermined allowable deviation.

According to the present invention, it is possible to compensate image signals to a status where there is no screen shake by the implementation of signal processing for the image signals.

The other objects and features of this invention will become understood from the following description with reference to the accompanying drawings.

BRIEF DESCRIPTION OF THE DRAWINGS

FIG. 2 through FIG. 5, FIG. 7, FIG. 14 and FIG. 15 are waveform diagrams for describing the operation of the motion detection apparatus of FIG. 1;

DETAILED DESCRIPTION OF THE PREFERRED EMBODIMENTS

The following is a detailed description of the specific content of the present invention, with reference to the appended drawings.

Figure 1:
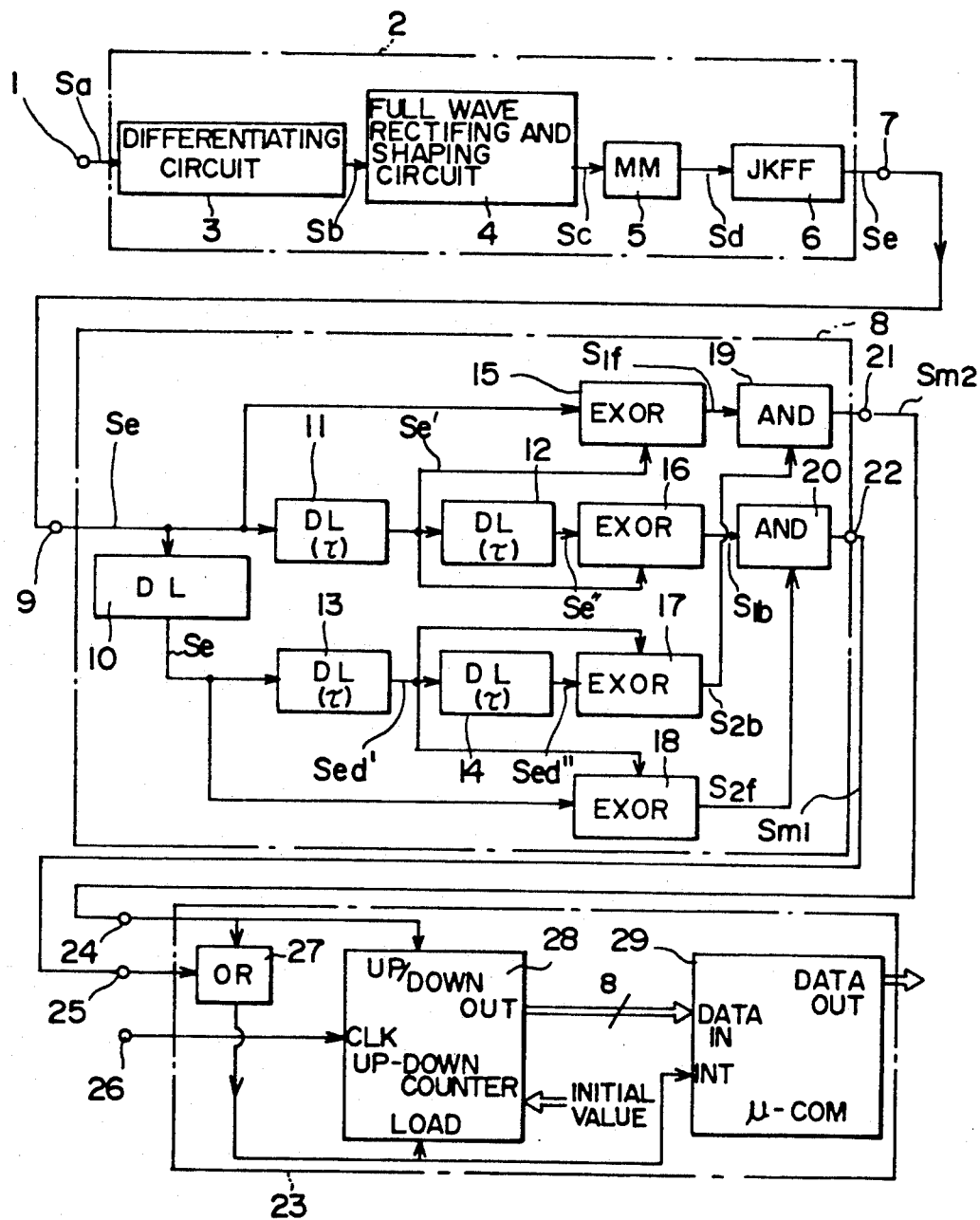
FIG. 1 is a block diagram of a motion detection apparatus including a preferred embodiment of a motion detector circuit according to the present invention.

A motion detection apparatus having a configuration that includes the motion vector detection circuit of the present invention and shown in FIG. 1 comprises a binary-coded edge portion signal generation circuit 2, a motion vector amount detection circuit 8 and a shake amount calculation circuit 23.

The binary-coded edge portion signal generation circuit 2 comprises a differentiating circuit 3, a full-wave rectifying and shaping circuit 4, a monostable multivibrator (MM) 5 and a JK flip-flop (JKFF) 6. The binary-coded edge portion signal generation circuit 2 implements a predetermined signal processing to an image signal Sa {see FIG. 2(a)} which is the object of detection of the motion vector and which is supplied to the input terminal 1, and then a binary-coded edgeportion signal Se {see FIG. 2(e)} that includes the information of the edge portion of the image in the image signal is sent from the output terminal 7.

Figure 2:
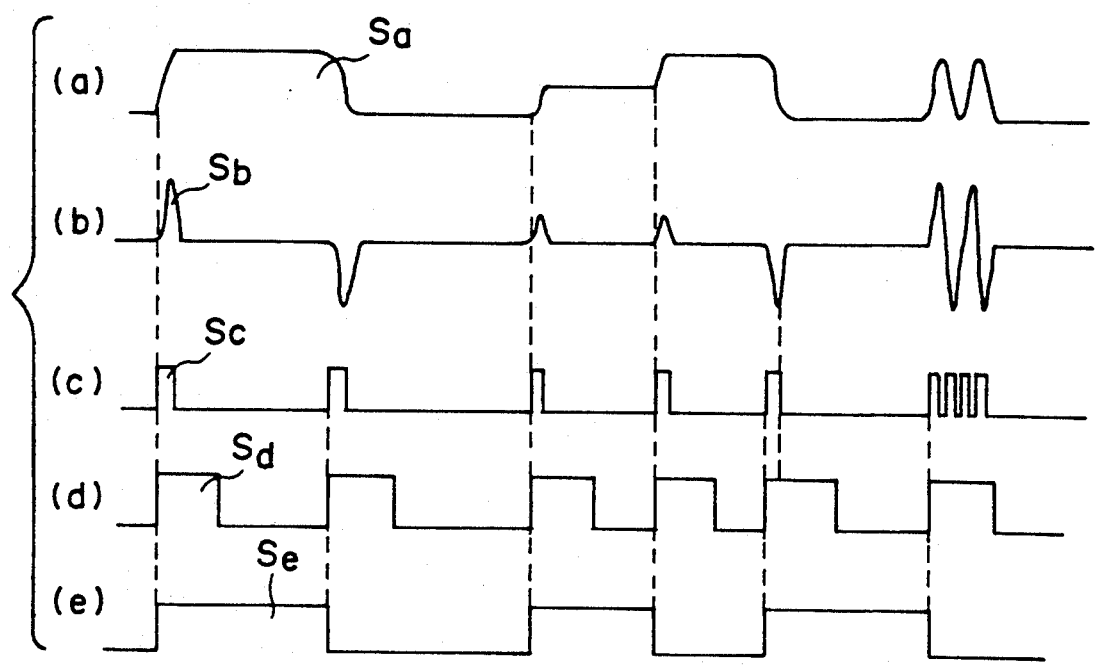

More specifically, the image signal Sa supplied to the differentiating circuit 3 from the input terminal 1 is given a primary differentiation at the differentiating circuit 3 and a differentiated signal Sb {see FIG. 2 (b)} corresponding to the edge portion of the image is sent from the differentiating circuit 3 and is applied to the full-wave rectifying and shaping circuit 4.

At the full-wave rectifying and shaping circuit 4, the supplied differentiated signal Sb is wave shaped after full-wave rectification has been performed and a signal Sc indicated in FIG. 2(c) is generated, and this is supplied to the monostable multivibrator 5.

The monostable multivibrator 5 is triggered by the signal Sc and generates an output pulse Sd {see FIG. 2(d)} that has a predetermined pulse width, and applied to the JK flip-flop 6.

The JK flip-flop 6 is triggered by the successive rise in the input pulse Sd, and the binary-coded edge portion signal Se {see FIG. 2(e)} that includes the information of the edge portion of the image in the image signal and is output to the output terminal 7.

In the binary-coded edge portion signal generation circuit 2 shown in FIG. 1, the information of the time positions corresponding to the edge portion of the image in the image signal triggers the monostable multivibrator 5 so as to cause it to generate the output pulse Sd having a predetermined pulse width.

Having the binary-coded edge portion signal generation circuit 2 have a configuration such as has been described above removes the edge portion information of the image that appears in the intervals inside the previously described pulse width, thereby to prevent the generation of error in a shake amount detection circuit (motion vector amount detection circuit) 8 to be described later, and to realize a reduction in the calculation time in a shake amount calculation circuit 23.

In addition, in the binary-coded edge portion signal generation circuit 2 the JK flip-flop 6 is used to reduce the apparent amount of information and to reduce the capacity of a delay circuit 10 provided in the motion vector amount detection circuit 8 and which introduces the time delay of one frame period (or one field period) to the binary-coded edge portion signal Se. Also, it is possible to realize a reduction in the calculation time in the shake amount calculation circuit 23.

More specifically, a pulse having the information of the time position corresponding to the edge portion of the image in the image signal can be identified as an edge portion of an image in the image signal by either its rise or fall and so the necessary information of an edge portion of an image in the image signal is obtained even if only the information of the rise of a pulse having the information of the time position corresponding to the edge portion of an image in the image signal is used.

Accordingly, the JK flip-flop 6 operates only by the information of the rise of a pulse having the information of the time position corresponding to the edge portion of an image in the image signals and therefore enables a reduction in the apparent amount of information to be realized.

Moreover, the description so far relating to the binary-coded edge portion signal generation circuit 2 has been for the configuration of a binary-coded edge portion signal generation circuit for the edge portion of the image exhibiting the status whereby it intersects the horizontal scanning direction but the binary-coded edge portion signal generation circuit for the edge portion of an image exhibiting a status whereby it intersects the vertical scanning direction can be configured so as to perform processing in the same manner by using a 1H (one horizontal scanning period) delay line as the delay line in the configuration of the differentiating circuit.

Then, the binary-coded edge portion signal Se that includes the information of the edge portion of the image sent from the output terminal 7 of the binary-coded edge portion signal generation circuit 2 is supplied to the input terminal 9 of the motion vector amount detection circuit 8.

The following is a description of the configuration and the operation of a preferred embodiment of the motion vector amount detection circuit 8. The motion vector amount detection circuit 8 comprises delay circuits (DL) 10 through 14, exclusive OR circuits (EXOR) 15 through 18, and AND circuits 19 and 20.

The binary-coded edge portion signal Se that is supplied to the motion vector amount detection circuit 8 via the input terminal 9 is input to the delay circuit 10 that introduces the time delay of one field period (or one frame period) to the binary-coded edge portion signal Se, the exclusive OR circuit 15 and the delay circuit 11.

The delay circuit 10 delays the binary-coded edge portion signal Se that includes the information of the edge portion of the image by a one frame period (or a one field period) and generates a delayed binary-coded edge portion signal Sed.

The delay time $\tau$ that should be set to the delay circuits 11 through 14 is so the motion vector amount detection circuit 8 can perform the detection of the shake amount (vector motion amount) for the case of the horizontal scanning direction and this delay time $\tau$ is set to several microseconds. However, the delay time $\tau$ that should be set to the delay circuits 11 through 14 is so the motion vector amount detection circuit 8 can perform the detection of the shake amount (vector motion amount) for the case of the vertical scanning direction and this delay time $\tau$ is set to several H periods.

In the motion vector amount detection circuit 8 shown in FIG. 1, a circuit configured from the delay circuits 11 and 12 and the exclusive OR circuits 15 and 16 used in the signal processing of the binary-coded edge portion signal Se, and the circuit configured from the delay circuits 13 and 14 and the exclusive OR circuits 17 and 18 used in the signal processing of the delayed binary-coded edge portion signal Sed output from the one-field period (or one-frame period) delay circuit 10 have the same configuration and the signal processing is the same. Therefore, even in FIG. 3 that shows the waveform used for the description of the operation of each of these circuits, in FIG. 3 (a) that for example, is an enlargement of the time base of the binary-coded edge portion signal Se for FIG. 2 (e), the signals shown in the figure are both used to describe the binary-coded edge portion signal Se and the delayed binary-coded edge portion signal Sed and the signals are labelled as Se(Sed).

Figure 3:
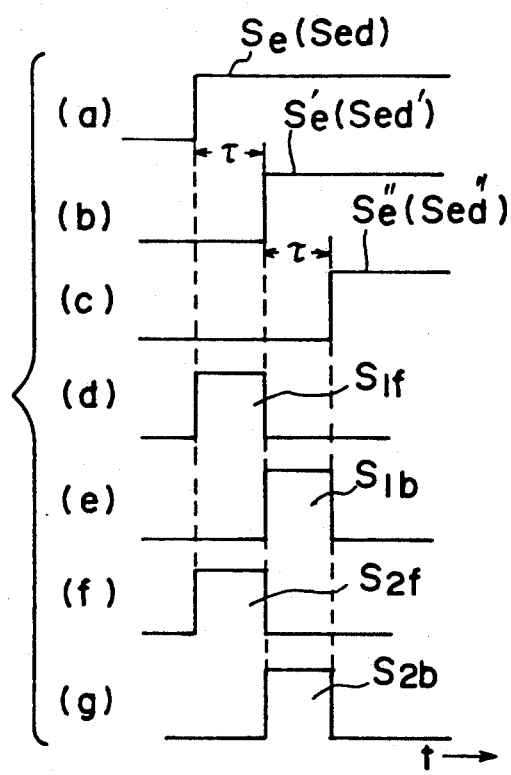

The binary-coded edge portion signal Se from the input terminal 9 {see FIG. 3 (a)} is supplied to the one frame period (or a one field period) delay circuit 10, the delay circuit 11 and the exclusive OR circuit 15, whereas in the delay circuit 11, the signal Se' that is the binary-coded edge portion signal Se to which a time delay of $\tau$ has been introduced, is supplied to the delay circuit 12 and the exclusive OR circuits 15 and 16.

The exclusive OR circuit 15 generates the signal S1f {see FIG. 3 (d)} as the output of the exclusive OR of the binary-coded edge portion signal Se {see FIG. 3 (a)} supplied from the input terminal 9 and the signal Se' output from the delay circuit 11 and applies this signal to the AND circuit 19.

Also, the delay circuit 12 to which the output signal Se' of the delay circuit 11 is applied, supplies to the exclusive OR circuit 16 the signal Se" shown in FIG. 3 (c) for the status where a time delay of $\tau$ is introduced to the signal Se'.

The exclusive OR circuit 16 generates the signal S1b {see FIG. 3 (e)} as the exclusive OR output of the signal Se' output from the delay circuit 11 and the signal Se" output from the delay circuit 12, and applies this to the AND circuit 20.

On the other hand, the exclusive OR circuit 18 generates the signal S2f {see FIG. 3 (f)} as the exclusive OR output of the delayed binary-coded edge portion signal Sed output from the delay circuit 10 and the signal Sed' output from the delay circuit 13, and applies this to the AND circuit 20. While the exclusive OR circuits 17 generates the signal S2b {see FIG. 3 (g)} as the exclusive OR output of the signal Sed' output from the delay circuit 13 and the signal Sed" output from the delay circuit 14, and applies it to the AND circuit 19.

In this AND circuit 19, the signal Sm2 that is the logical product of the output signal S2b output from the exclusive OR circuit 17 and the output signal S1f of the exclusive OR circuit 15, or more specifically, the detection signal Sm2 for the amount of shake (motion vector amount) is sent to the output terminal 21. And in the AND circuit 20, the signal Sm1 that is the logical product of the output signal S2f output from the exclusive OR circuit 18 and the signal S1b output from the exclusive OR circuit 16, or more specifically, the detection signal Sm1 for the amount of shake (motion vector amount) is sent to the output terminal 22.

As has been described above, the signal S1f output from the exclusive OR circuit 15 and the signal S1b output from the exclusive OR circuit 16, are as is clear from FIG. 3, the first before edge portion pulse S1f and the first after edge portion pulse which that have the same pulse width $\tau$ and which are respectively positioned on one of the two sides of the time position of the edge portion in the signal Se'. And as has also been described above, the signal S2f output from the exclusive OR circuit 18 and the signal S2b output from the exclusive OR circuit 17, are the second before edge portion pulse S2f and the second after edge portion pulse S2b which have the same pulse width $\tau$ and which are respectively positioned on one of the two sides of the time position of the edge portion in the signal Sed'.

The signals S1f, S1b, S2f and S2b shown in FIG. 3 (d) through (g) are in the status where the edge portion in the image signals that are separated on the time base by a one-frame (or one field) period, are at the same position in the image, in that they are respective pulses that are generated so as to correspond to the status where there is no motion in the image for a one-field (or one-frame) period. In this status, the signal S1f output from the exclusive OR circuit 15 and the signal S2f output from the exclusive OR circuit 18 are in the status where they are completely overlapped, and the signal S1b output from the exclusive OR circuit 16 and the signal S2b output from the exclusive OR circuits 17 are also in the status where they are completely overlapped. Therefore, the after edge portion of the signal S1f and the before edge portion of the signal S1b, and the after edge portion of the signal S2f and the before edge portion of the signal S2b are positioned at the same time positions, respectively.

Accordingly, in this status, the signal S1f and the signal S2b do not have any portions that overlap on the time base and so there is no shake amount (motion vector amount) detection signal Sm2 output to the output terminal 21 from the AND circuit 19 supplied with the signal S1f and the signal S2b.

In the same manner, for this status, there is no portion where the signal S1b and the signal S2f overlap on the time base and so there is no shake amount (motion vector amount) detection signal Sm1 output to the output terminal 22 from the AND circuit 20 supplied with the signal S1b and the signal S2f.

Following this, when the image has moved in the one-field (or one-frame) period, the edge portion of the image in the current image signals moves either up, down, left or right with respect to the edge portion of the image in the image signals preceding by one-field (or one-frame) period and so the binary-coded edge portion signal Se that is generated on the basis of the edge portion of the image in the image signals is also displaced on the time base either before or after the signals Sed that is generated on the basis of the edge portion of the image in the image signals preceding by one-field (or one-frame) period.

Accordingly, a displacement corresponding to the shake of the screen is caused between the position on the time base of the signal S1b and the signal S1f which have the same pulse width $\tau$ and which are respectively positioned on one of the two sides of the time position of the edge portion in the binary-coded edge portion signals, and the position on the time base of the signal S2b and the signal S2f which both have the same pulse width $\tau$ and which are respectively positioned on one of the two sides of the time position of the edge portion of the delayed binary-coded edge portion signals.

This displacement corresponding to the screen shake is output from the AND circuit 19 to the output terminal 21 as the detection signal Sm2 for the shake amount (motion vector amount), or is output from the AND circuit 20 to the output terminal 22 as the detection signal Sm1 for the shake amount (motion vector amount), the pulse width of which detection signal Sm2 or Sm1 changes in accordance with the screen shake amount.

Figure 4:
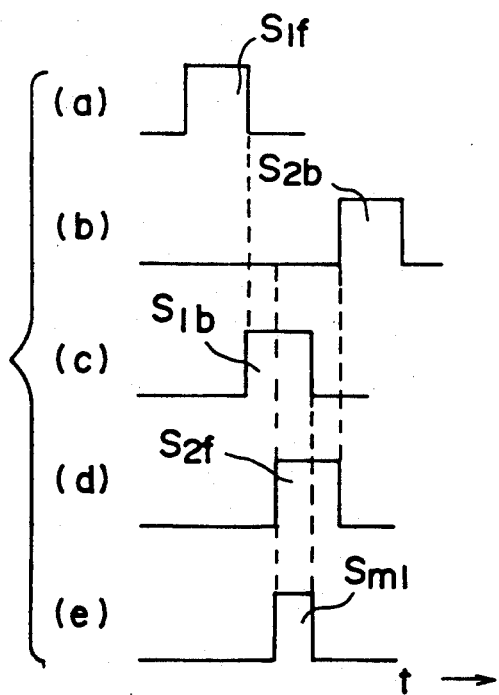
Figure 5:
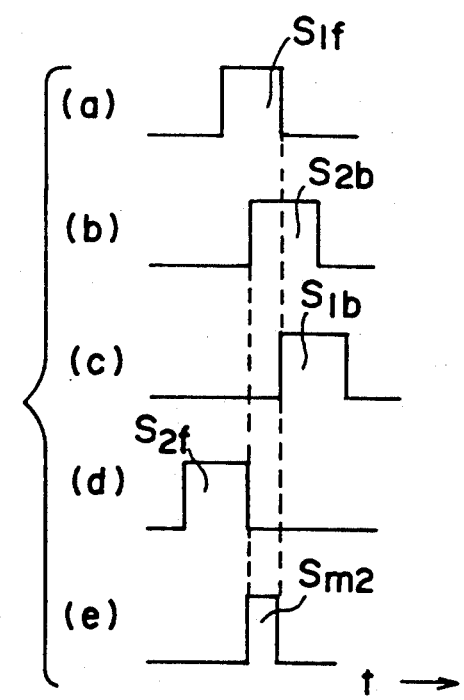

FIG. 4 and FIG. 5 show the cases where the position on the time base of the signal S1b and the signal S1f generated in accordance with the edge portion of the image of the current image signals has moved to the left (FIG. 4) and the right (FIG. 5) with respect to the position on the time base of the signal S2f and S2b that are generated in accordance with the edge portion of the image of the image signals one-field (or one-frame) period before because the image has moved in a one-field (or one-frame) period. FIG. 4 shows the status where the detection signal Sm1 for the shake amount (motion vector amount) and for which the pulse width changes in accordance with the shake amount of the screen is output from the AND circuit 20 to the output terminal 22, and FIG. 5 shows the status where the detection signal Sm2 for the shake amount (motion vector amount) and for which the pulse width changes in accordance with the shake amount of the screen is output from the AND circuit 19 to the output terminal 21.

When the delay time $\tau$ of the delay circuits 11 through 14 is set larger than the maximum screen shake that should be compensated for, and is made one third or less than the width of the output pulse of the monostable multivibrator 5 provided in the binary-coded edge portion signal generation circuit 2, the malfunction of the circuit 8 can be prevented from occurring.

Figure 6:
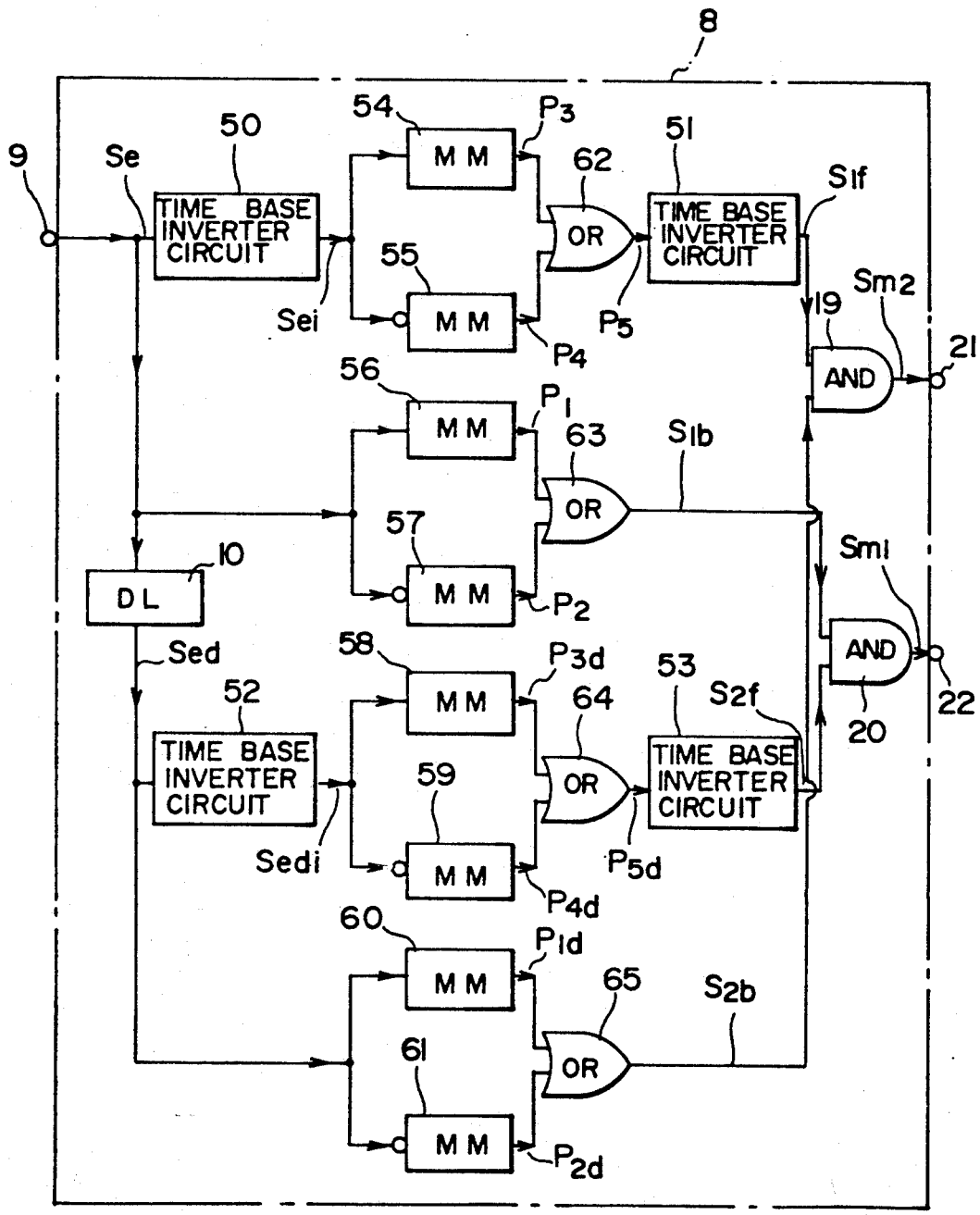
FIG. 6 is a block diagram of another preferred embodiment of a motion vector amount detection circuit included in the motion detection circuit of FIG. 1.
Figure 7:
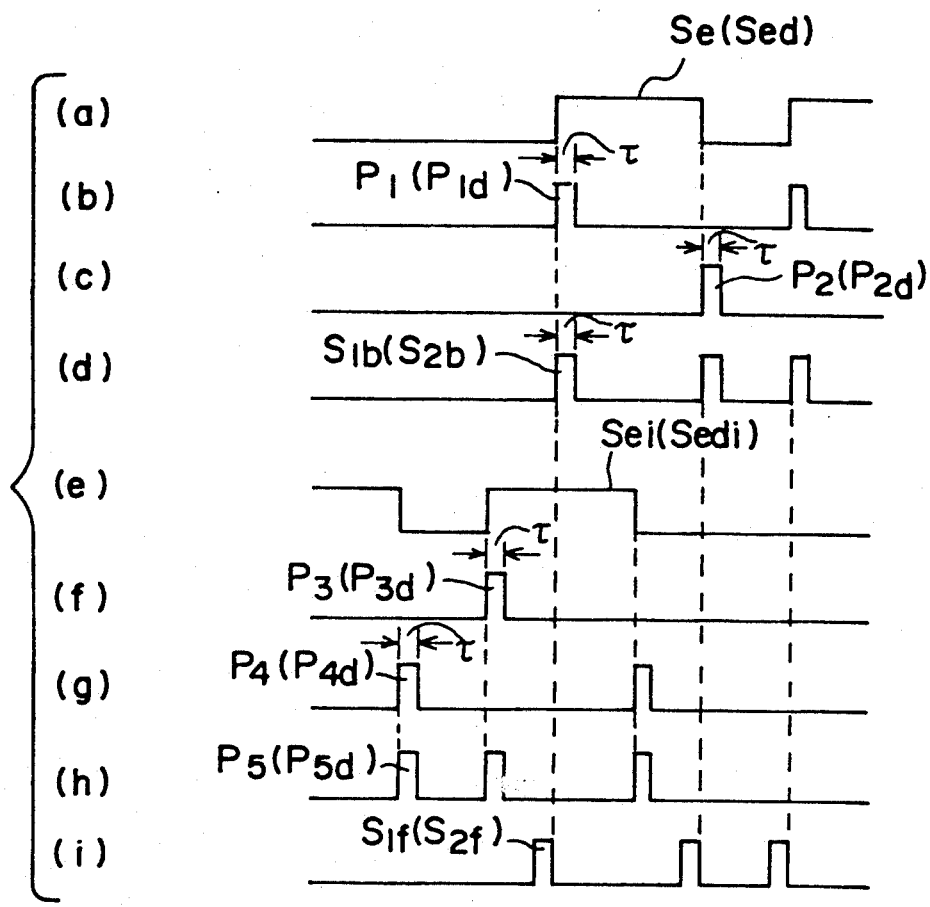

The following is a preferred embodiment of another configuration of the motion vector amount detection circuit 8 shown in FIG. 6, with reference to FIG. 7. In FIG. 6, the motion vector amount detection circuit 8 comprises a delay circuit 10, time base inverter circuits 50 to 53, monostable multivibrators 54 to 61, OR circuits 62 to 65 and AND circuits 19 and 20.

The time base inverter circuits 50 to 53 are provided with functions so that it is possible for the input signals to be output as signals in the status where the time base is inverted, and are easily realized by a configuration where for example, the signal is written to a memory and read out conversely.

In the following description, the suffix "i" such as in Sei, is appended to the binary-coded edge portion signal of the status where the time base is inverted and which is output from the time base inverter circuit 50 {see FIG. 7 (e)}, and the suffix "i" such as in Sedi, is appended to the delayed binary-coded edge portion signal of the status where the time base is inverted and which is output from the time base inverter circuit 52 {see FIG. 7 (e)}.

The monostable multivibrators 54, 56, 58 and 60 are configured so as to be triggered by trigger pulses of positive polarity and so as to respectively output pulses of the pulse width $\tau$, and the monostable multivibrators 55, 57, 59 and 61 are configured so as to be triggered by trigger pulses of negative polarity and so as to respectively output pulses of the pulse width $\tau$.

The delay time $\tau$ that should be set to the monostable multivibrators 54 to 61 is set to several microseconds when the motion vector amount detection circuit 8 is configured so as to perform the detection of the shake amount (motion vector amount) in the horizontal scanning direction, and is set to several H periods when the motion vector amount detection circuit 8 is configured so as to perform the detection of the shake amount (motion vector amount) in the vertical scan direction.

As has been described earlier for the delay circuit 10 of FIG. 1, the delay circuit 10 of FIG. 6 is for the generation of the delayed binary-coded edge portion signal Sed that introduces a one-field (or one-frame) period delay time to the binary-coded edge portion signal Se that includes the information for the edge portion of the images.

The motion vector amount detection circuit 8 shown in FIG. 6 has the same configuration as the circuit arrangement configured from time base inverter circuits 50 and 51 used in the signal processing of the signal Se supplied from the input terminal 9, the monostable multivibrators 54 to 57 and the OR circuits 62 and 63, and the circuit arrangement configured from time base inverter circuits 52 and 53 used in the signal processing of the signals Sed supplied from the delay circuit 10, the monostable multivibrators 57 to 60 and the OR circuits 64 and 65, and the signal processing is also the same. And so in FIG. 7, corresponding numerals are used for corresponding signals in FIG. 6 in order to facilitate description since the circuit arrangement and the description thereof is the same.

The signal Se supplied via the input terminal 9 to the motion vector amount detection circuit 8 shown in FIG. 6 is input to the one frame period (or a one field period) delay circuit 10, the time base inverter circuit 50 and the monostable multivibrators 56 and 57. The monostable multivibrator 56 to which the signal Se is applied as the trigger signal, applies to the OR circuit 63 the output pulse P1 having the pulse width of $\tau$ as shown in FIG. 7 (b) at each rise of the signal Se, and the monostable multivibrator 57 to which the signal Se is applied as the trigger signal applies to the OR circuit 63 the output pulse P2 having the pulse width $\tau$ as shown in FIG. 7 (c) at each fall of the signal Se, and the signal S1b is supplied to the AND circuit 20 from the OR circuit 63.

The time base inverter circuit 50 generates the signal Sei shown in FIG. 7 (e) for the inverted status of the signal Se, and supplies this as a trigger signal to the monostable multivibrators 54 and 55.

The monostable multivibrator 54 applies an output pulse P3 having the pulse width $\tau$ as shown in FIG. 7 (f) to the OR circuit 62 for each fall of the signal Sei, and the monostable multivibrator 55 applies an output pulse P4 having the pulse width $\tau$ as shown in FIG. 7 (g) to the OR circuit 62 for each fall of the signal Sei, and generates the pulse P5 shown in FIG. 7 (h) and applies it from the OR circuit 62 to the time base inverter circuit 51.

The time base inverter circuit 51 inverts the time base of the signal P5, generates the first before edge portion pulse S1f as shown in FIG. 7 (i) and supplies it to the AND circuit 19.

On the other hand, the monostable multivibrator 60 to which the signal Sed output from the delay circuit 10 is applied as the trigger signal applies the output pulse P1d of pulse width r as shown in FIG. 7 (b) to the OR circuit 65 for each rise of the signal Sed, and the monostable multivibrator 61 to which the signal Sed is applied as a trigger signal applies the output pulse P2d having the pulse width $\tau$ to the OR circuit 65 for each fall of the signal Sed, which then supplies the signal S2b to the AND circuit 19.

The time base inverter circuit 52 to which the signal Sed has been supplied generates the signal Sedi shown in FIG. 7 (e) and with the time base of the signal Sed in the inverted status, and applies it to the monostable multivibrators 58 and 59 as the trigger signal.

The monostable multivibrator 58 applies an output pulse P3d having a pulse width $\tau$ and shown in FIG. 7 (f) to the OR circuit 64 for each rise of the signal Sedi, and the monostable multivibrator 59 applies an output pulse P4d having the pulse width $\tau$ and shown in FIG. 7 (g) to the OR circuit 64 for each fall of the signal Sedi, which then generates the pulse signal P5d shown in FIG. 7 (h) and supplies it to the time base inverter circuit 53.

The time base inverter circuit 53 inverts the time base of the signal P5d, generates the second before edge portion pulse S2f as shown in FIG. 7 (i) and supplies it to the AND circuit 20.

The AND circuit 19 sends to the output terminal 21 the signal Sm2 which is the logical product of the signals S1f and S2b, that is the detection signal Sm2 for the shake amount (motion vector amount). In addition, the AND circuit 20 sends to the output terminal 22 the signal Sm1 which is the logical product of the signals S1b and S2f, that is the detection signal Sm1 for the shake amount (motion vector amount).

Figure 8:
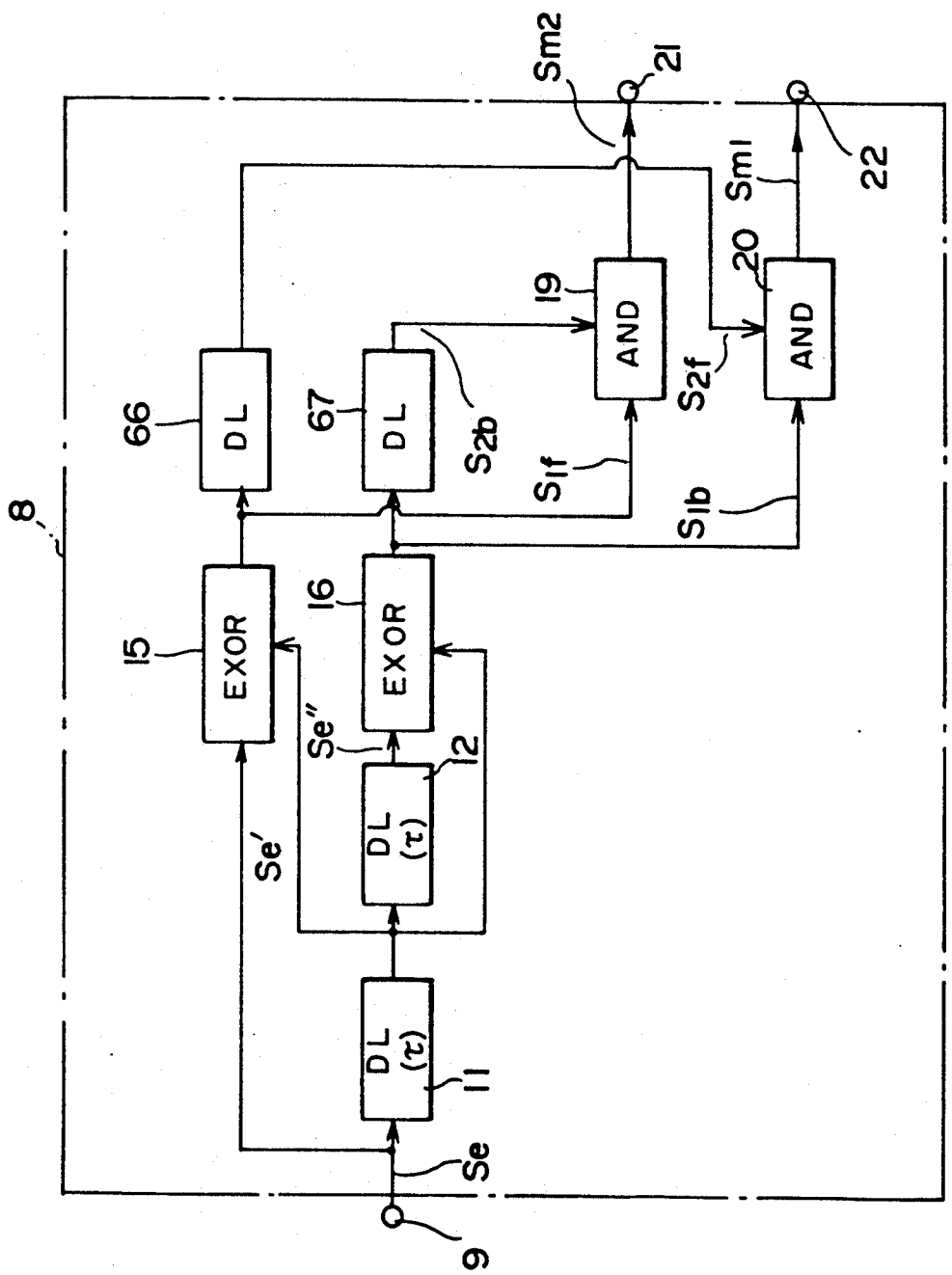
FIG. 8 is a block diagram of still another preferred embodiment of a motion vector amount detection circuit included in the motion detection circuit of FIG. 1.

The following is a description of still another preferred embodiment of the motion vector amount detection circuit 8 shown in FIG. 8. The motion vector amount detection circuit 8 shown in FIG. 8 comprises the delay circuits 11 and 12, the exclusive OR circuit 15 and 16, the delay circuits 66 and 67 and the AND circuits 19 and 20.

The signal Se {see FIG. 3 (a)} supplied via the input terminal 9 is applied to the delay circuit 11 with a delay time of $\tau$ and to the exclusive OR circuit 15, and the signal Se' {see FIG. 3 (b)} output from the delay circuit 11 is applied to the exclusive OR circuit 15 and to the delay circuit 12 with a delay time of $\tau$, and the signal Se" output from the delay circuit 12 is applied to the exclusive OR circuit 16.

The exclusive OR circuit 15 generates the signals S1f {see FIG. 3 (d)} that is the exclusive OR output of the signal Se and the signals Se', and supplies the signal S1f to the AND circuit 19 and the delay circuit 66.

Also, the exclusive OR circuit 16 generates the signal S1b (see FIG. 3 (e)} that is the exclusive OR output of the signals Se' and the signals Se" and supplies the signal S1b to the AND circuit 20 and the delay circuit 67.

These delay circuits 66 and 67 respectively apply a delay time of one-field (or one-frame) period with respect to the signals S1f and S1b that are supplied to each of them.

The delay circuit 66 generates the signal S2f {see FIG. 3 (f)} and applies the signal S2f to the AND circuit 20 and the delay circuit 67 generates the signal S2b {see FIG. 3 (g)} and applies the signal S2b to the AND circuit 19.

Here the AND circuit 20 sends the signal Sm1 which is the logical product of the signals S1b and S2f, that is the detection signal Sm1 for the shake amount (motion vector amount), to the output terminal 22, and the AND circuit 19 sends the signal Sm2 which is the logical product of the signals S1f and S2b, that is the detection signal Sm2 for the shake amount (motion vector amount), to the output terminal 21.

These detection signals Sm2 and Sm1 output from the output terminals 21 and 22 are sent to the input terminals 24 and 25 in the shake amount calculation circuit 23, respectively in FIG. 1.

The shake amount calculation circuit 23 in FIG. 1 comprises an OR circuit 27, an up-down counter 28 and a calculation circuit for the shake amount of the screen in the horizontal scanning direction, and is configured using a microcomputer 29.

The signal Sm2 supplied to the input terminal 24 of the shake amount calculation circuit 23 is applied to the OR circuit 27 and is also used as up-down control input for the up-down counter 28.

The OR circuit 27 has both the signals Sm2 and Sm1 applied to it and so both of the signals Sm2 and Sm1 from the OR circuit 27 are output, and applied to the up-down counter 28 as the load signal.

The timing of the supply of the data from the up-down counter 28 to the microcomputer 29 is irregular and so an interrupt is applied to the microcomputer 29 at the time of the fall of the signals Sm2 and Sm1 so that the data supplied from the up-down counter 28 is buffered.

With respect to FIG. 4 and FIG. 5, the up-down counter 28 performs operation as an up counter when the screen has moved to the right side, and performs operation as a down counter when the screen has moved to the left side.

Then, the signals Sm2 and Sm1 supplied as the load signal to the up-down counter 28 have a time length (pulse width) corresponding to the shake amount of the screen and so a count value of the clock signals corresponding to the amount and the direction of the screen shake is output from the up-down counter 28 and this is applied to the microcomputer 29 as data but this input data is buffered by an interrupt (see the flow chart on the right side of the flowchart of FIG. 9) applied to the microcomputer 29 at the point when there is the fall of the signals Sm2 and Sm1 as has already been described.

Figure 9:
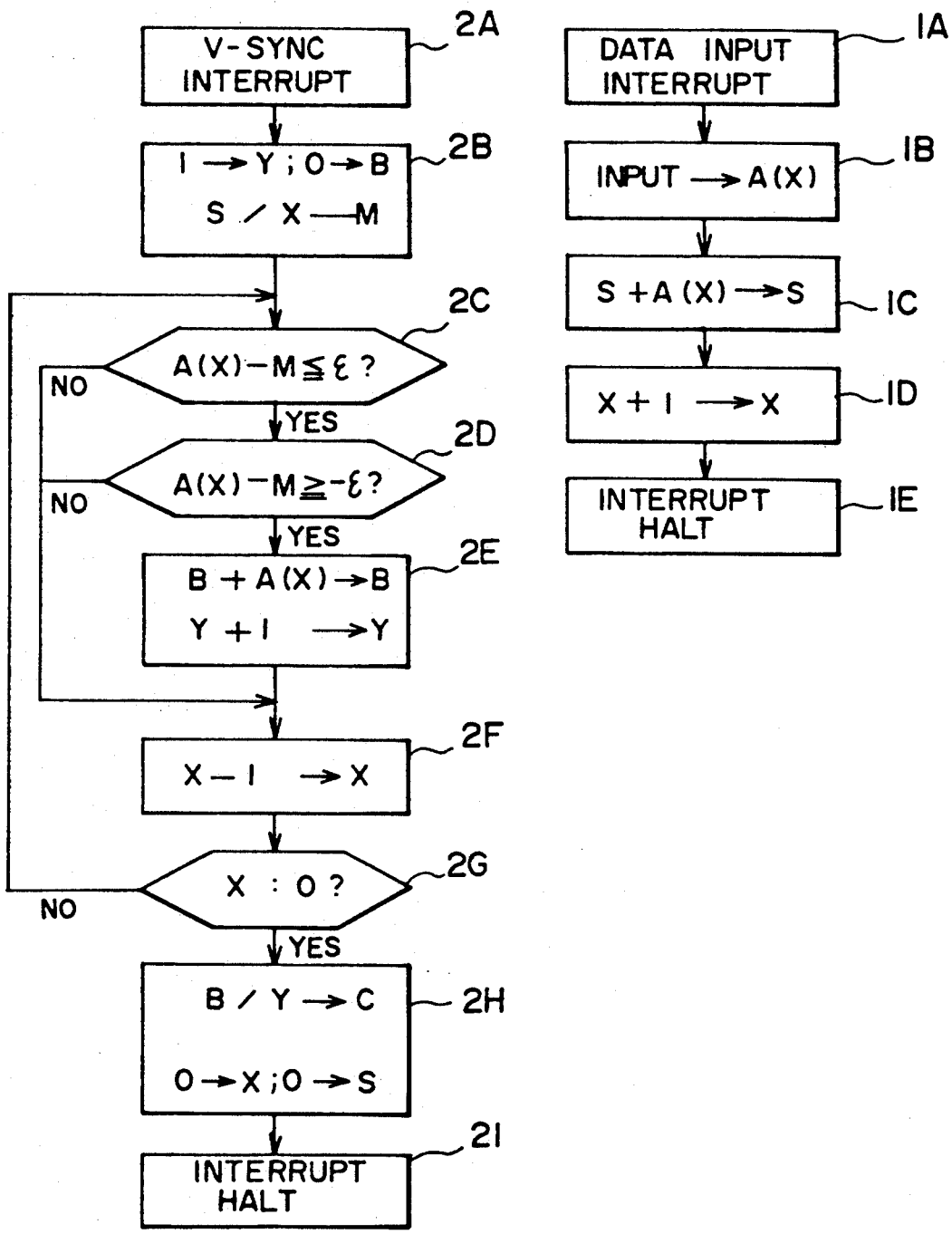
FIG. 9 is a flowchart for describing a portion of the operation of the motion detection apparatus of FIG. 1.

The microcomputer 29 performs the calculation operation in accordance with the flowchart shown in FIG. 9.

When a data input interrupt is applied to the microcomputer 29 in STEP 1A, the data supplied from the up-down counter 28 are buffered successively in STEP 1B. A buffered data is added to a previous data to obtain a total sum S of the shake amount within one-field (or one-frame) in STEP 1C. The number of input data (a pointer X) is counted up in STEP 1D. Then, the data input interrupt is halted in STEP 1E.

Next when interrupt is applied to the microcomputer 29 by a vertical synchronizing signal from such as a synchronizing signal generator (not shown) in STEP 2A. A pointer Y of data for calculation is set at 1 and data B for motion vector calculation is set at 0, and then an average value M of the input data is determined by the number of data X and the total sum S in STEP 2B.

The average value M is subtracted from each input data A(x) to judge if the input data A(x) is within a predetermined allowable deviation $\epsilon$ from the average value M in STEPS 2C or 2D. If input the data A(x) is within the allowable deviation $\epsilon$, the input data A(x) is set as the data B and the number of the pointer Y is counted up in STEP 2E.

However, if the input data A(x) is outside the allowable deviation $\epsilon$ in STEPS 2C or 2D, such input data A(x) is excepted from the shake amount as it is the movement of the object. Then, the program jumps to STEP 2F to count down the pointer X.

It is judged if all the input data A(x) are processed through the STEPS 1A to 2E in STEP 2G. If so, a motion vector amount C is determined by the data B and the number of pointer Y and both the number of data X and the total sum S are set at 0 in STEP 2H. And the interrupt is halted in STEP 2I.

If all the input data A(x) are not yet processed through the STEPS 1A to 2E in STEP 2G, the program returns to the STEP H. The shake amount calculations are performed within the vertical-blanking interval and in accordance with the flowchart on the left side of FIG. 9, because of the interrupt by the vertical-synchronizing signal.

Figure 10:
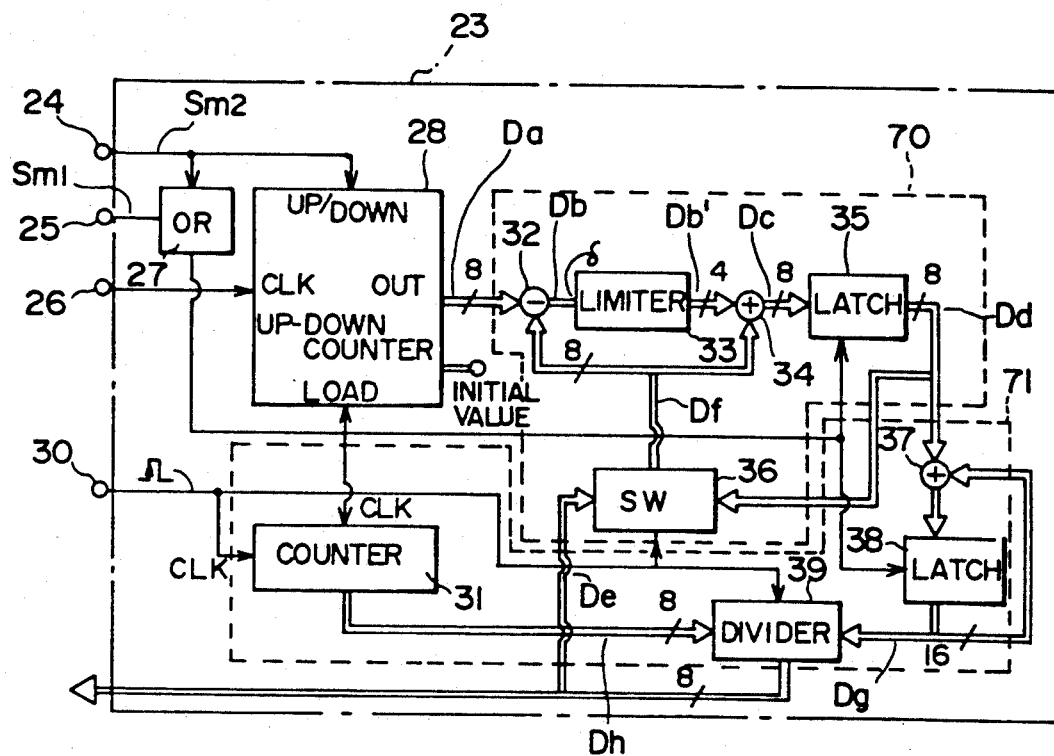
FIG. 10 is a block diagram of another preferred embodiment of a shake amount calculation circuit included in the motion detection circuit of FIG. 1.

FIG. 10 shows another preferred embodiment of the shake amount calculation circuit 23 configured using a calculation circuit for the shake amount of the screen in the horizontal scan direction, and without using a microcomputer. The shake amount calculation circuit 23 comprises an OR circuit 27, an up-down counter 28, a counter 31, a subtracter 32, a limiter 33, adders 34 and 37, latch circuits 35 and 38, a switch circuit (SW) 36 and a divider 39. In FIG. 10, the signals Sm2 and Sm1 output from the output terminals 21 and 22 of the motion vector amount detection circuit 8 described earlier are supplied to the input terminals 24 and 25.

The signal Sm2 supplied to the input terminal 24 is applied to the OR circuit 27, and is also used as up-down control input for the up-down counter 28.

The OR circuit 27 also has the signal Sm1 applied to it and so both of the signals Sm2 and Sm1 are output from the OR circuit 27, and are applied as a load signal to the up-down counter 28.

In addition, the output signal from the OR circuit 27 is supplied as a clock signal to the counter 31 and is also supplied to the latch circuits 35 and 38 as a latch signal.

The signal of the vertical scan period supplied to the input terminal 30 is applied to the counter 31 as a clear signal, is supplied to the switch circuit 36 as a switch timing signal, and to the divider 39 as an entry signals.

The up-down counter 28 operates as an up counter in the case where the image has moved to the right side and operates as a down counter in the case where the image has moved to the left side.

Then, the signals Sm2 and Sm1 suppled as the load signal to the up-down counter 28, have a time length (pulse width) corresponding to the amount of shake of the screen and so the data Da of the total value of the clock signal corresponding to the direction and the amount of screen shake is output from the up-down counter 28 and supplied to the subtractor 32 as the minuend.

The subtractor 32 and the limiter circuit 33, the adder 34, the latch circuit 35 and the switch circuit 36 configure a compensation circuit 70 that performs compensation so that the results of shake amount calculation are not influenced by data that has a large deviation.

In addition, the adder 37, the latch circuit 38, the divider 39 and the counter 31 configure a shake amount calculation circuit 71 that determines the average of the data that has been compensated by the compensation circuit 70, and calculates the final shake amount.

The following is a description of the operation in the shake amount calculation circuit 23 of FIG. 10. The data Da output from the up-down counter 28 is applied to the subtractor 32 as data of minuend signal, and the data Db for the difference δ between the data Df of the pulse width corresponding to the amount and direction of screen shake (to be described later) and which is supplied to the subtractor 32, and the data Da of the current pulse width, is output from the subtractor 32 and supplied to the limiter circuit 33.

When there is normal operation, the data Df that is supplied to the subtractor 32 as a subtrahend signal is the data Dd which is supplied to the subtractor 32 as data Df via the switch circuit 36 and in the status where compensation has been performed with respect to the data of the pulse width that corresponds to the amount and direction of screen shake and which is output from the up-down counter 28 the previous time for the data Da. However, the calculation of the shake amount is performed for each one-field (or one-frame) period and so in the status where data Da of the first pulse width of each field (or each one frame) is supplied to the subtractor 32, there is none of the previous data Dd in that field (or frame) and so in this case, the data De that is output from the shake amount calculation circuit 23 in the previous field (or the previous one frame) is supplied via the switch circuit 36 to the subtractor 32 as the data Df.

The motion of the edge portion of each portion in the same screen due to the motion of the subject within the data Da is haphazard, on the contrary, the motion of each of the edge portions in the same screen due to screen shake is substantially constant.

Accordingly, when the current data Da is due to the motion of the object, the data Db due to the difference δ and output from the subtractor 32 has a large absolute value and when the current data Da is due to screen shake, the data Db that is due to the difference δ output from the subtractor 32 becomes approximately zero.

Figure 11:
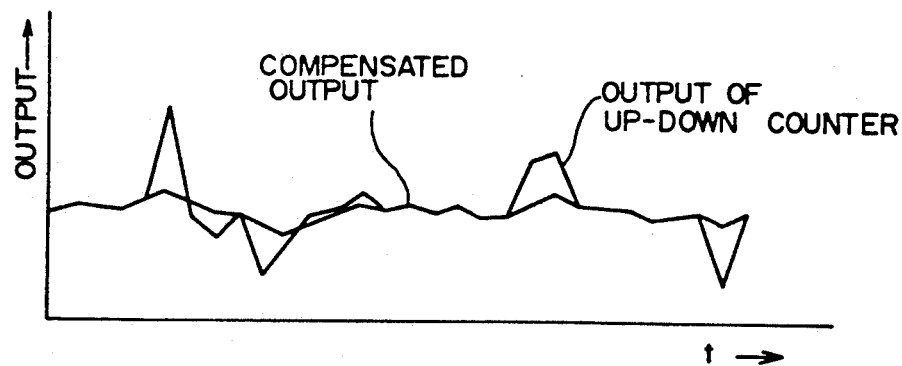
FIG. 11 is the characteristic for describing a portion of the operation of the shake amount calculation circuit of FIG. 10.

Then, if the absolute value of the data Db is limited by the limiter circuit 33, it is possible to reduce the influence of the motion of the object (see FIG. 11).

The data Db' that is output from the limiter circuit 33 is added in the adder 34 to the data Dd in the status where compensation has been performed for the previous time with respect to data of the pulse width that corresponds to the direction and amount of the previous time screen shake and which has been output from the up-down counter 28. And so the data Dc that has been compensated for the data Da this time, is obtained from the adder 34 and that data Dc is latched to the latch circuit 35 and the compensated data Dd is output from the latch circuit 35 for the data Da this time.

The compensated data Dd is supplied to the switch circuit 36 and the adder 37.

The data that is output from the adder 37 is supplied to the latch circuit 38 and the data Dg that is output from the latch circuit 38 is supplied to the adder 37 and the divider 39.

The data Dh that is supplied from the counter 31 is supplied to the divider 31 as the total number N of the load (latch) pulse. Then, immediately prior to the vertical-blanking interval, the divider circuit 39 performs the calculation of (data Dg)÷(data Dh), and determines the average value.

$$Dg/Dh = \left( \left( \sum_{k=1}^{N} Ddk \right) / N \right) = \text{average value}$$

Figure 12:
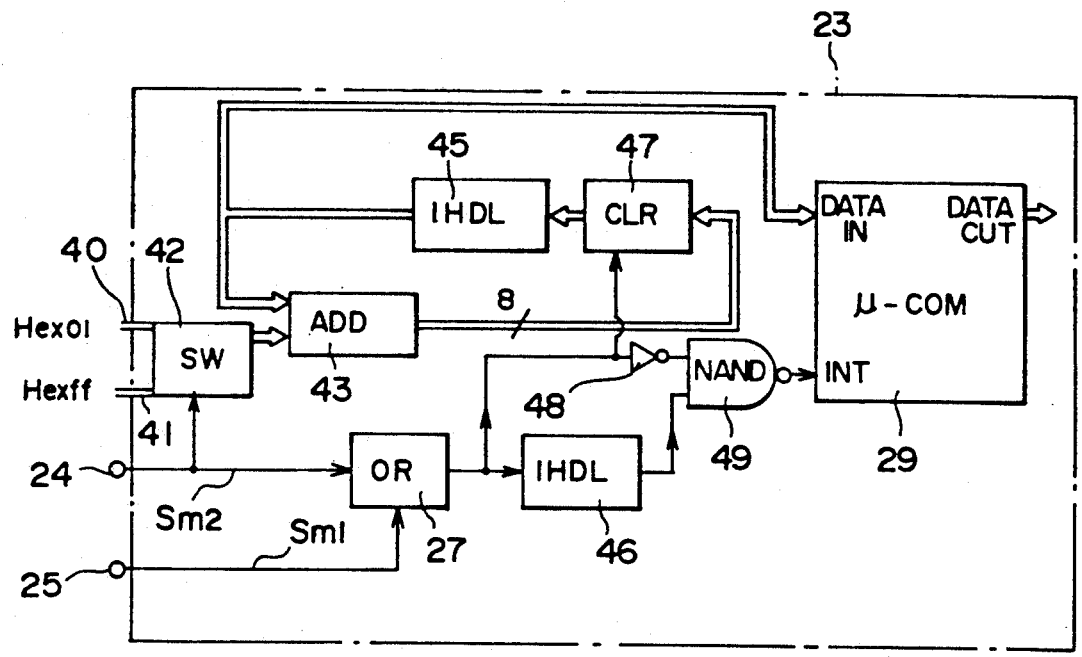
FIG. 12 is a block diagram of still another preferred embodiment of a shake amount calculation circuit included in the motion detection circuit of FIG. 1.

FIG. 12 shows a still another preferred embodiment of the shake amount calculation circuit 23 for the case for when a microcomputer is used as the calculation circuit for the screen shake in the vertical scan direction. The shake amount calculation circuit 23 shown in FIG. 12 comprises a switch circuit 42, an adder 43, 1H delay circuits 45 and 46, a clear circuit (CLR) 47, an inverter 48, a NAND circuit 49, a microcomputer 29 and an OR circuit 27. In FIG. 12, the signals Sm2 and Sm1 output from the output terminals 21 and 22 of the motion vector amount detection circuit 8 are supplied to the input terminals 24 and 25.

The signal Sm2 supplied to the input terminal 24 is supplied to the OR circuit 27 and is also supplied to the switch circuit 42 as a switching control signal.

The switch circuit 42 supplies the value "00000001" (i.e. +1) that is supplied to the input 40, to the adder 43 when the switching control signal is "1", and when the switching control signal is "0", supplies the adder 43 with the value "11111111"(i.e. −1) that is supplied to the input 41.

A circuit composed of the switch circuit 42, the adder 43, the 1H delay circuit 45 and the clear circuit 47 corresponds to the up-down counter 28 of FIG. 1.

The supplying of the values (+1) and (−1) to the inputs 40 and 41 respectively corresponds to up/down-counting of the up-down counter 28 of FIG. 1.

The signal Sm2 supplied to the input terminal 24 is supplied to the OR circuit 27 and the signal Sm1 supplied to the input terminal 25 is also supplied to the OR circuit 27. So both of the signals Sm2 and Sm1 are output from the OR circuit 27, and are also supplied to the 1H delay circuit 46 and the inverter 48, and also to the clear circuit 47.

Figure 13:
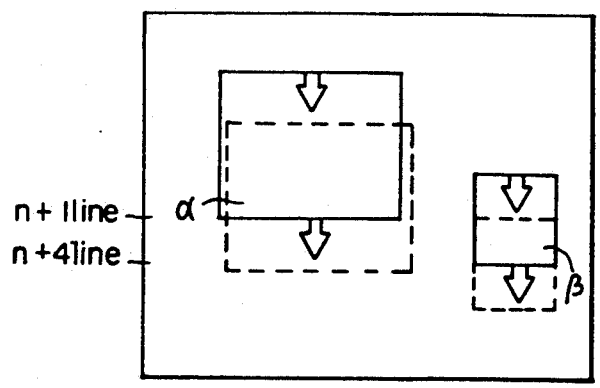
FIG. 13 is a view showing an example of screen shake.
Figure 14:
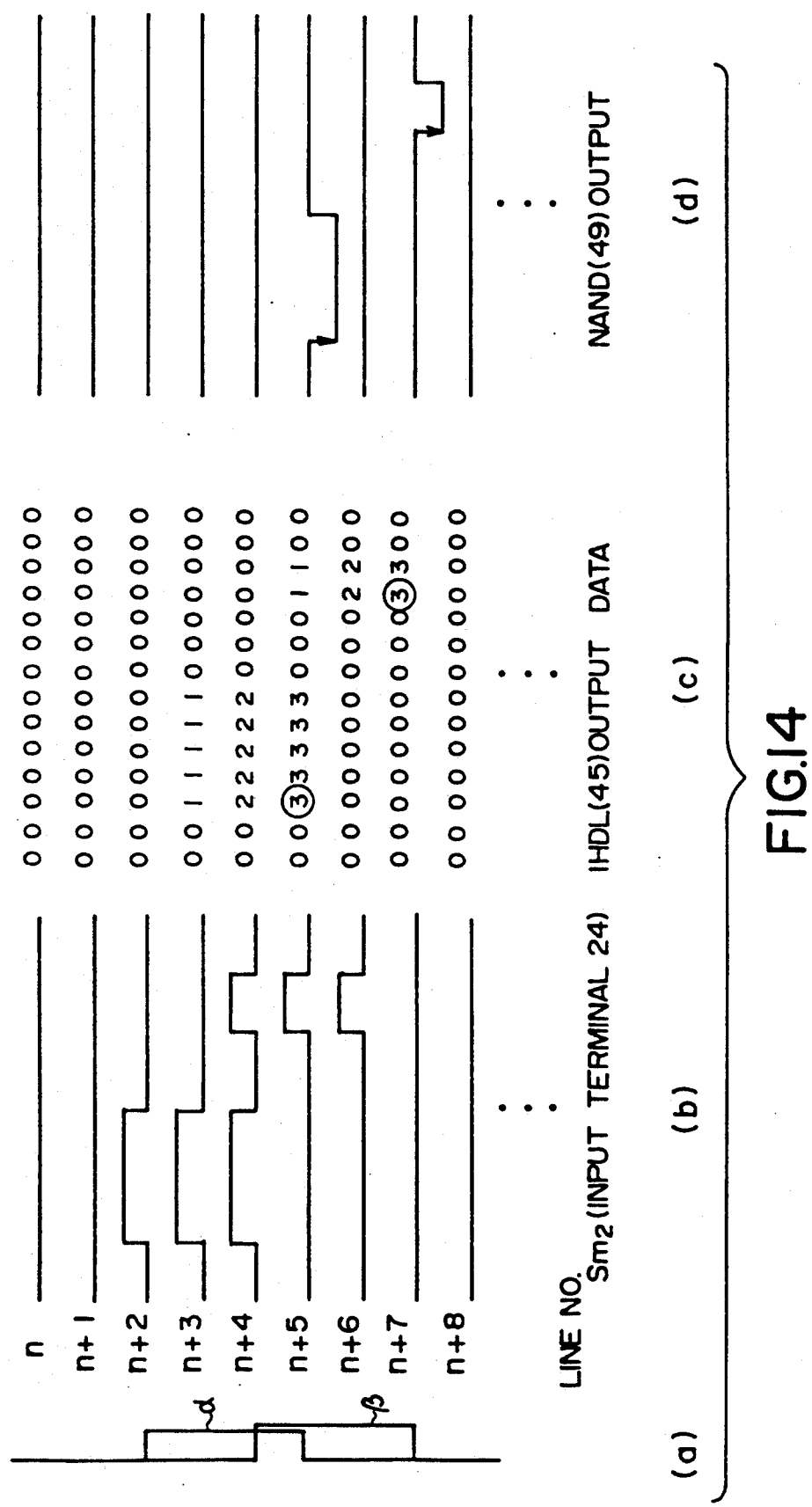

However, when there is shake of the screen in the direction such as that indicated in FIG. 13, for example, the signal Sm1 always becomes "0" and only the signal Sm2 is generated but in this case, if the screen shakes from the positions indicated by the solid lines α and β in FIG. 13 to the positions indicated by the broken lines, then the signal Sm2 becomes a pulse shape of the edge in the vertical direction as shown by α and β in FIG. 14 (a), and this is shown in FIG. 14 (b) in terms of the H rate.

The signal output from the 1H delay circuit 46 and the signal output from the inverter 48 are supplied to the NAND circuit 49 and the data output from the NAND circuit 49 is supplied to the interrupt terminal of the microcomputer 29. The output from the adder 43 is supplied to the clear circuit 47. This clear circuit 47 performs clear operation when the output from the OR circuit 27 is "0" and supplies "0" to the 1H delay circuit 45.

When there is "1" output from the OR circuit 27, the signal that is supplied from the adder 43 to the clear circuit 47 is supplied to the 1H delay circuit 45. The output of this 1H delay circuit 45 is supplied to the adder 43 and is also supplied to the data input terminal of the microcomputer 29.

Then, when the output An of the adder 43 has the signal Sm1 as "1", $$An = (An-1) - 1 \text{ as down count}$$

and when the signal Sm2 is "1", there is $$An = (An-1) + 1 \text{ as up count}$$

and when the signals Sm1 and Sm2 are "0"

$$An = -1 \text{ as count stop.}$$

Then, the output data shown in FIG. 4 (c) of the adder 43 which is supplied via the clear circuit 47 and the 1H delay circuit 45 is supplied to the data input terminal of the microcomputer 29 and at the fall, in terms of the H rate, of the output of the NAND circuit 49 the point shown by the downwards arrow {see FIG. 14 (d)} that indicates the falling edge of the motion vector pulse in the vertical direction shown in FIG. 14 (c), the data {the portion shown circled in FIG. 14 (c)} is taken into the microcomputer 29. This microcomputer 29 performs the calculation operation in accordance with the flowchart shown in FIG. 9.

FIG. 14 (a) through (d) and FIG. 15 (a) through (e) show the status of the output of each circuit and the signals of FIG. 12 for convenience of reference.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A motion vector circuit for detecting screen shake of an image of an object, comprising:
   binary-coded edge portion signal generation means for signal processing a video signal corresponding to the image to generate a binary-coded edge portion signal including information of the edge portion of the image;
   detection means for delaying the binary-coded edge portion signal by a predetermined period of time to generate a delayed binary-coded edge portion signal so as to generate detection signals with time width corresponding to shake amount of the image by means of the binary-coded edge portion signal and the delayed binary-coded edge portion signal; and
   calculation means for generating moving vector signals corresponding to the moving direction and the shake amount of the image by means of the detection signals to calculate the shake amount of the image by means of the moving vector signals and predetermined allowable deviation.

2. The circuit according to claim 1, wherein the binary-coded edge portion signal generation means comprises:
   differentiated signal generation means for primary-differentiating the video signal to generate a differentiated signal corresponding to the edge portion of the image; and
   triggering signal generation means for rectifying and shaping the differentiated signal to generate a triggering signal, thus to generate the binary-coded edge portion signal by mean of the triggering signal.

3. The circuit according to claim 1, wherein the detection means comprises:
   first edge portion pulse generation means for generating a first before-edge portion signal and a first after-edge portion signal, both having the same pulse width on each of the two sides of a time portion of the edge of the binary-coded edge portion signal;
   second edge portion pulse generation means for generating a second before-edge portion signal and a second after-edge portion signal, both having the same pulse width on each of the two sides of a time portion of the edge of the delayed binary-coded edge portion signal;
   first pulse generation means for generating a first pulse having a pulse width corresponding to the shake amount of the image by the logical product of the first before-edge portion signal and the second after-edge portion signal; and
   second pulse generation means for generating a second pulse having a pulse width corresponding to the shake amount of the image by the logical product of the first after-edge portion signal and the second before-edge portion signal.

4. The circuit according to claim 1, wherein the predetermined period of time is on field of the image.

5. The circuit according to claim 1, wherein the predetermined period of ti... is one frame of the image.

6. The circuit according to claim 3, wherein the calculation means generates the moving vector signals by OR operation of the first and the second pulses and compares the moving vector signals with the predetermined allowable deviation to determine that the moving vector signals do not represent the shake of the image if the former is larger than the latter and that the moving vector signals represent the shake of the image if the former is smaller than the latter.

7. The circuit according to claim 6, wherein an average value of the moving vector signals in a field/frame of the video signal is used for calculating the shake amount of the image.

* * * * *